(12) United States Patent
Kim et al.

(10) Patent No.: US 6,389,424 B1
(45) Date of Patent: May 14, 2002

(54) INSERTION METHOD IN A HIGH-DIMENSIONAL INDEX STRUCTURE FOR CONTENT-BASED IMAGE RETRIEVAL

(75) Inventors: June Kim; Dae Young Hur; Jin Soo Lee, all of Daejon-Shi; Jae Soo Yoo; Seok Hee Lee, both of Chongju-Shi, all of (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 0 days.

(21) Appl. No.: 09/429,300

(22) Filed: Oct. 28, 1999

(30) Foreign Application Priority Data

Oct. 28, 1998 (KR) .............................................. 98-45434

(51) Int. Cl.7 ............................................. G06F 17/30
(52) U.S. Cl. ...................................... 707/100; 707/101
(58) Field of Search ................................ 707/100, 1, 2, 707/6, 7, 101, 102, 104, 3, 5; 345/589; 382/225, 226, 227

(56) References Cited

U.S. PATENT DOCUMENTS

| | | | |
|---|---|---|---|
| 5,647,058 A | | 7/1997 | Agrawal et al. ................. 707/1 |
| 5,752,243 A | | 5/1998 | Reiter et al. ..................... 707/3 |
| 5,761,652 A | | 6/1998 | Wu et al. ......................... 707/2 |
| 5,978,794 A | * | 11/1999 | Agrawal et al. ................. 707/3 |
| 5,987,468 A | * | 11/1999 | Singh et al. ................. 707/100 |
| 6,084,595 A | * | 7/2000 | Bach et al. .................. 345/589 |
| 6,154,746 A | * | 11/2000 | Berchtold et al. .......... 707/100 |
| 6,263,334 B1 | * | 7/2001 | Fayyad et al. ................... 707/5 |
| 6,307,965 B1 | * | 10/2001 | Agrawal et al. ............ 382/225 |

OTHER PUBLICATIONS

K.I. Lin et al., "The TV–Tree—An Index Structure For High–Dimensional Data", 1994, pp. 1–30.
Stefan Berchtold et al., "The X–Tree: An Index Structure For High–Dimensional Data", 1996, pp. 28–39.
David S. White, "Similarity Indexing With The SS–Tree", 1996, pp. 1–7.

* cited by examiner

*Primary Examiner*—Sanjiv Shah
(74) *Attorney, Agent, or Firm*—Antonelli, Terry, Stout & Kraus, LLP

(57) ABSTRACT

An insertion method in a high-dimensional index structure for a content-based image retrieval is disclosed, in which a desired image can be efficiently searched when there is formed a high-dimensional image database. In the present invention, the basic properties of the CIR tree are utilized, and at the same time, a splitting algorithm having a superior search efficiency over the conventional CIR tree is employed. Further, an effective standard for choosing lower nodes is provided, and a re-insertion algorithm capable of re-inserting based on a weighted center is employed, thereby forming an ECIR (Extended CIR) as a high-dimensional index structure supporting efficient retrieval performance. That is, a splitting algorithm for the branch nodes and the terminal nodes are adopted so as to improve the efficiency when carrying out the search and insertion. The re-insertion objects are chose based on the weighted center when the nodes overflow. According to the present invention, the images can be efficiently searched when an image information containing many feature dimensions is formed into a database.

7 Claims, 6 Drawing Sheets

INSERTION METHOD IN A HIGH-DIMENSIONAL INDEX STRUCTURE FOR CONTENT-BASED IMAGE RETRIEVAL

BACKGROUND OF THE INVENTION

1. Field of the Invention

The present invention relates to an indexing structure for retrieving a large capacity image database. Particularly, the present invention relates to an insertion method in a high-dimensional index structure for a content-based image retrieval, in which a desired image can be efficiently searched when there is formed a high-dimensional image database.

2. Description of the Prior Art

In handling a large capacity image database, the main problem is the search efficiency, and to solve this problem, a proper indexing technique has to be developed. The high-dimensional index structure is the one which is capable of efficiently accessing the data based on various feature values. This structure can be usefully applied to a content-based image retrieval.

There have been carried out many studies on the high-dimensional index structure based on various features. However, in the conventional high-dimensional index structure such as the R*-tree, as the number of dimensions (features) is increased, so the time and spatial requirements are exponentially increased. Therefore, in the case of a high-dimensional (more than 6 image databases), it is no better than the sequential retrievals, with the result that the indexing structure loses its effect. In an attempt to solve this problem, two proposals were made for the indexing structure of the content-based image retrieval system.

The first is the typical value representing (grouping) method. In this method, the number of dimensions of the image data is reduced, so that it can be used as an indexing structure for the content-based image retrieval. This is attained by grouping the image features, or by representing the typical values of them. In this method, the image data are expressed by converting the high-dimensional feature space to a low dimensional feature space. Therefore, when a large capacity image is searched, the search range becomes large, with the result that the search performance is markedly aggravated.

The second is a high-dimensional index structure capable of accommodating a large amount of image features. This indexing structure includes: a telescopic vector (TV) tree, a similarity search (SS) tree, an extended (X) tree, and a content-based image retrieval (CIR) tree. The TV tree variably uses the number of indexing dimensions to solve the conventional problem that the time or spatial requirement is exponentially increased in accordance with the increase of the number of the features. In this method, however, overlaps occur very much during the split, with the result that the search performance is significantly aggravated.

The SS tree is a dynamic structure which is designed to efficiently handle the similarity queries. In this method, overlaps also frequently occur during the split, and as the number of features increases, so much the time requirement increases.

The X tree is a high-dimensional index structure which is proposed to prevent the overlapping region which is the cause of the degradation of the search performance. However, in this method also, the search performance is significantly aggravated during the data processing.

The CIR tree variably uses the feature data, and uses super node having a size equal to an integer-multiple of that of the normal node and storable continuously on a disc. Therefore, it can efficiently accommodate the high-dimension feature. The performance evaluation shows that the CIR tree is superior over the TV tree and the X tree.

As described above, in the conventional high-dimensional index structures, as the number of dimensions are increased, so the time and spatial requirements are exponentially increased. As a result, they cannot accommodate the high-dimensional image data.

SUMMARY OF THE INVENTION

The present invention is intended to overcome the above described disadvantages of the conventional techniques.

Therefore it is an object of the present invention to provide an insertion method in high-dimensional index structure for the content-based image retrieval, in which the conventional problem, i.e., the exponential increase of the time and spatial requirements in accordance with the increase of the dimensions is solved, thereby making it possible to efficiently accommodate the high-dimensional features.

In achieving the above object, the insertion method in a high-dimensional index structure for a content-based image retrieval according to the present invention includes the steps of: (a) inserting an object into a root node if a tree consists of only a root node; (b) forming a new root node when the existing root node overflows; (c) inserting an object if lower nodes of the root node are branch nodes, and choosing the branch nodes in a sequence of one having less overlaps with nearby nodes, one having same values in many dimensions, one showing less increase in a minimum bounding region size, and one disposed more adjacently to the center; (d) choosing reinsertion objects based on the weight from the branch node if the branch node overflows; (e) splitting the branch node if the branch node overflows, and otherwise, adjusting the minimum bounding region; (f) choosing a lower node as a terminal node to insert an object if a lower node of the root node is a branch node; (g) choosing reinsertion objects based on the weight center from the terminal node if the terminal node with an object inserted into it overflows; and (h) dividing the terminal node, and then, carrying out the steps (c) to (g) to insert a new object into the branch node if the terminal node overflows after the re-insertion.

In another aspect of the present invention, the recording medium according to the present invention includes: a means for judging on constituent elements of a tree; a means for inserting an object into a root node if the tree consists of a root node, and forming a new root node if the existing root node overflows; a means for inserting an object if lower nodes of the root node are branch nodes, and choosing the branch nodes in a sequence of one having less overlaps with nearby nodes, one having same values in many dimensions, one showing less increase in a minimum bounding region size, and one disposed more adjacently to a center; a means for adding a mean value of a minimum bounding region if the branch node overflows, obtaining a weight center by dividing by a number of entries, and choosing objects in a sequence of remote positioning from the weight center to insert them into the branch nodes; a means for splitting the branch node if the branch node overflows with the objects, and otherwise, adjusting the minimum bounding region; a means for choosing a terminal node if a lower node of the root node is a terminal node or if a lower node of the branch node is a terminal node, then inserting an object into the terminal node, then adding an object value of a same dimension, then obtaining a weight center by dividing by a number of entries, and then choosing another object to insert it into the terminal node; and a means for dividing the terminal node if the terminal node overflows, and inserting a new object into the branch node, whereby a program for activating the above means is read by a computer.

In the present invention, the basic properties of the CIR tree are utilized, and at the same time, a split algorithm having a superior search efficiency over the conventional CIR tree is employed. Further, an effective standard for choosing lower nodes is provided, and a re-insertion algorithm capable of re-inserting based on a weight center is employed, thereby forming an ECIR (Extended CIR) as a high-dimensional index structure having an efficient tree structure.

BRIEF DESCRIPTION OF THE DRAWINGS

The above object and other advantages of the present invention will become more apparent by describing in detail the preferred embodiment of the present invention with reference to the attached drawings in which.

Similar reference characters refer to similar parts in the several views of the drawings.

DETAILED DESCRIPTION OF THE PREFERRED EMBODIMENT

Figure 1:
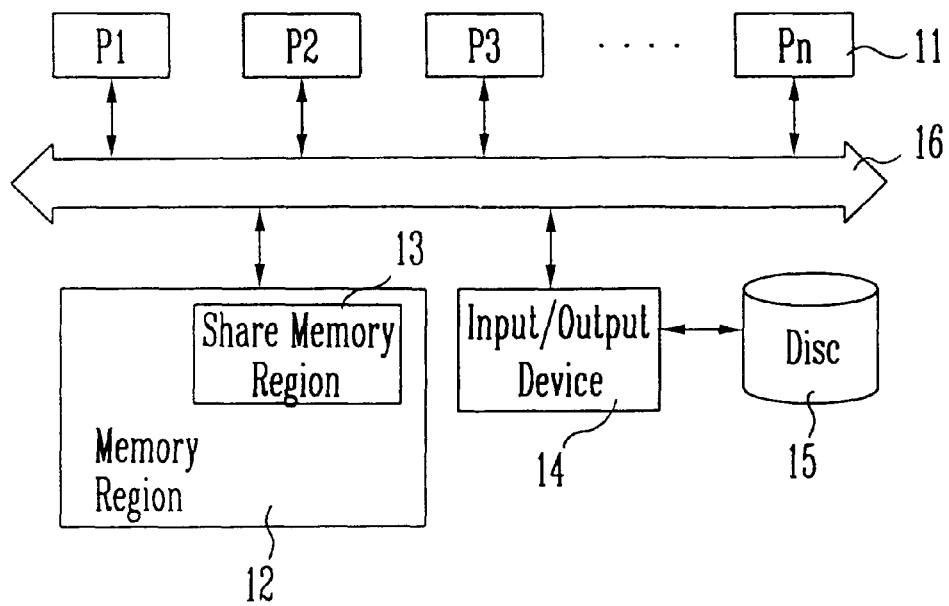
FIG. 1 illustrates the hardware applied to the present invention.

FIG. 1 illustrates the hardware applied to the present invention. A system bus 16 is connected to a single or multiple processors (p1 .... Pn) 11, to a memory region 12 of a main memory, and to an input/output device 14. The memory region 12 includes a share memory 13, and the input/output device 14 is connected to a disc 15 which is an auxiliary memory.

In this way, the present invention operates in an environment which includes a single or multiple processors 11 and a share memory region 13.

Figure 2:
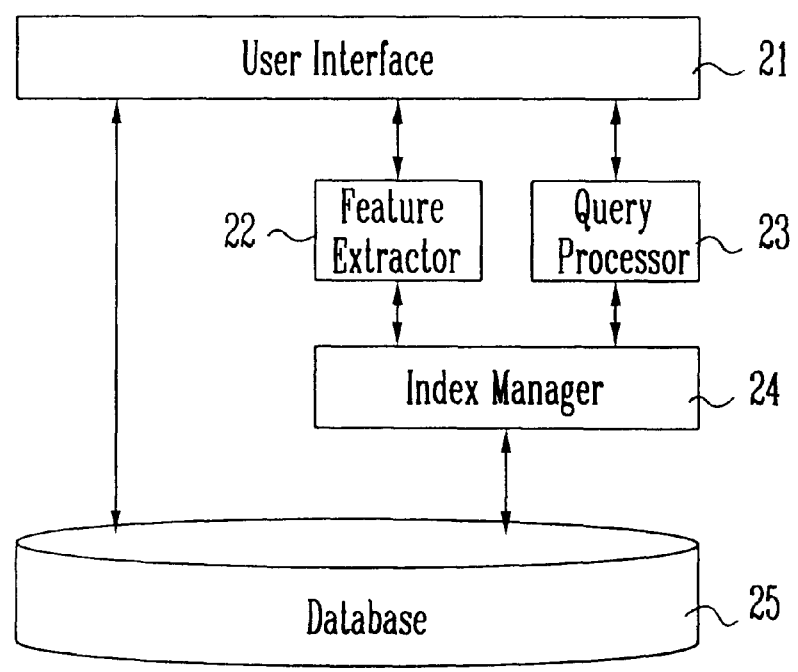
FIG. 2 illustrates the image search system architecture applied to the present invention.

FIG. 2 illustrates the image search system architecture applied to the present invention. An user interface 21 is a module which provides an interface for an image search and an image construction. A feature extractor 22 is a module for extracting the features representing the image when the image of the user interface 21 is stored into a database 25. A query processor 23 is a module which assigns the conditions of the images to be searched to an index manager 24. The index manager 24 is a module which constructs an index tree for fast access to the extracted features of the feature extractor 22. The database 25 stores information on the images themselves, and stores an index tree for the index manager 24. Therefore, the image information which has been known through the user interface 21 and the query processor 23 is recognized by the index manager 24. Then the relevant images are read from the database 25 directly. The present invention concentrates on the index manager 24.

Figure 3:
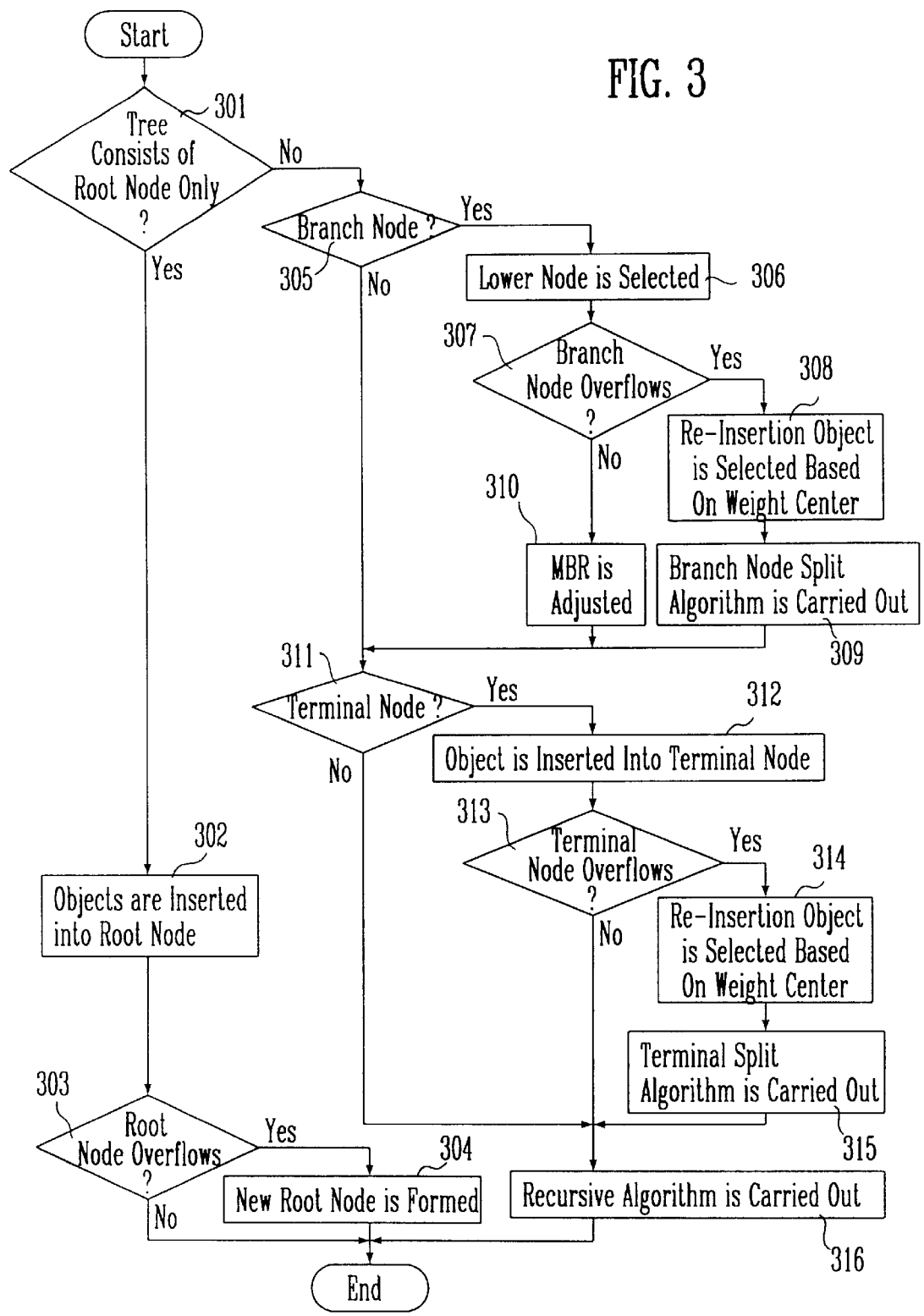
FIG. 3 is a flow chart showing the method for inserting the objects into the ECIR tree according to the present invention.

FIG. 3 is a flow chart showing the method for inserting the objects into the ECIR tree according to the present invention. If the tree consists of a root node only 301, an object is inserted into the root node 302. When inserting the object into the root node, if the root node is fall of other objects 303, then a new root node is formed, and the previous root node is divided into two terminal nodes 304.

If the tree consists of nodes other than the root node 301, then it is checked whether the lower node of the root node is a branch node 305. If it is a branch node, the lower node is chosen 306, and the lower node is decided based on the following sequence.

[1] The one showing a low increase of overlaps with nearby nodes after insertion of an object.

[2] The one showing same values in many dimensions.

[3] The one showing a low increase in the size of the minimum bounding region (to be called "MBR" below) after insertion of object.

[4] The one proximally disposed to the center.

Among the above items, [1] and [4] are those which were used in the conventional CIR-tree. In the present invention, items [2] and [3] are added.

If the chosen lower node, i.e., the branch node is full of other objects 307, a re-insertion object is chosen based on the weight center to re-insert it into the branch node 308. If the branch node is full after the re-insertion, then a branch node split algorithm is carried out 309, this being illustrated in FIG. 4. If it is not full, the MBR is adjusted 310.

If the lower node of the root node is a terminal node at the step 305, or if a terminal node is chosen as the lower node of the branch node after carrying out the steps 308 to 310, then an object is inserted into the terminal node 312. After this, if the terminal node is full of other objects 313, then an object is chosen based on the weight center to re-insert it into the terminal node 314. After the re-insertion, if the terminal node is full of objects, then a terminal node split algorithm is carried out 315, this being illustrated in FIG. 5.

If the terminal node does not overflow at the step 312, a recursive function is performed out after carrying out the terminal node split algorithm at the step 315, so as to insert a new object into the branch node 316.

Figure 5:
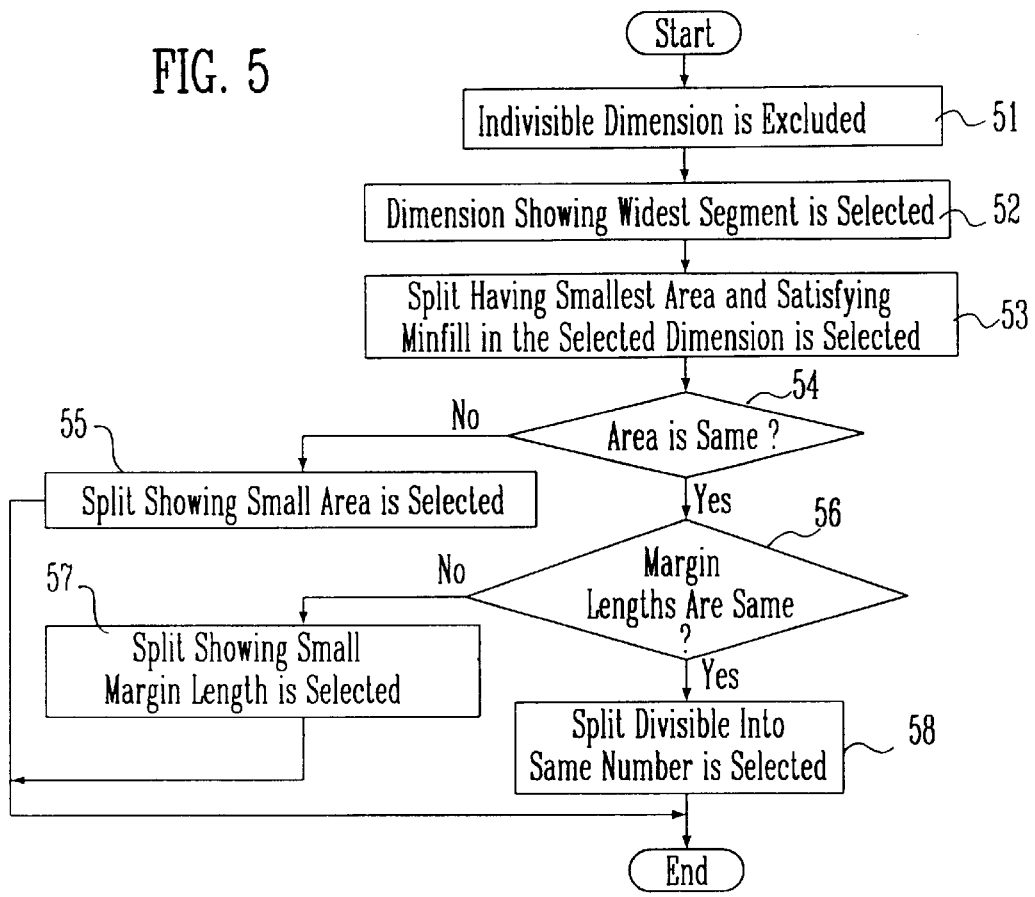
FIG. 5 is a flow chart showing the dividing algorithm for the terminal node according to the present invention.

As shown in FIG. 5, although the conventional CIR tree uses sometimes an extended node in the terminal node split algorithm, the ECIR tree of the present invention does not use an extended node.

Figure 4:
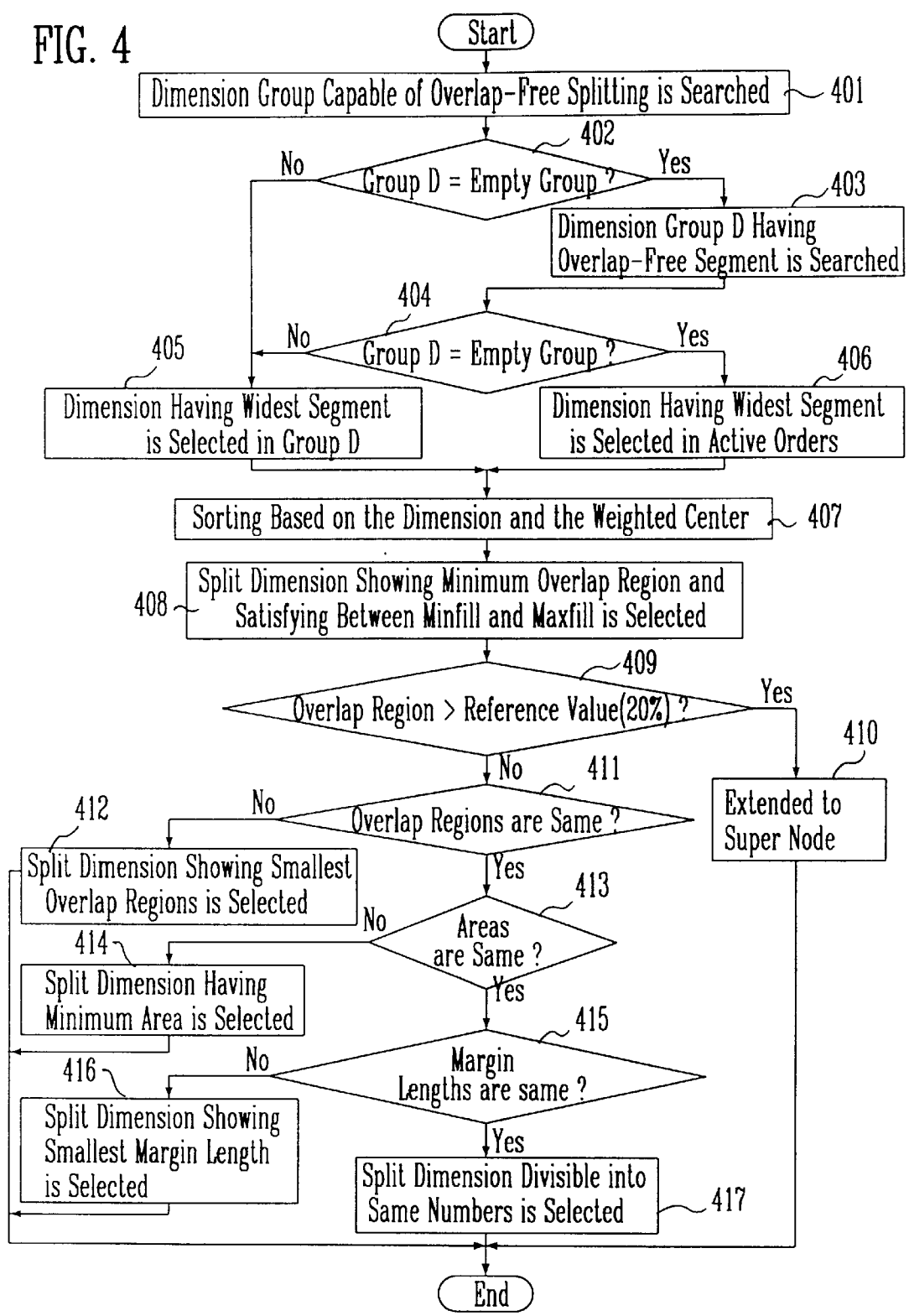
FIG. 4 is a flow chart showing the dividing algorithm for the branch node according to the present invention.

FIG. 4 is a flow chart showing the splitting algorithm for the branch node according to the present invention. For the purpose of splitting, the first dimension as the criteria of the splitting is decided. For this purpose, the dimensions (capable of overlap-free splitting) which are divisible and do not generate any overlap regions are searched 401. The information on the dimensions is stored in a group parameter called D. If there is no such overlap-free splitable dimension, then the dimensions are searched which satisfies the minimum number of the filling objects (to be called "minfill" below), and in which there are non-overlapping regions 403. If no dimensions are found at the step 403 404, then the widest dimension is chosen from among the active dimensions 405. If several dimensions are found, the widest dimension among them is chosen 405. After choosing the dimension, entries in the node are sorted based on the dimension and the weighted center 407. From among the splitted two nodes, there is chosen the one which shows the smallest overlap regions between the minfill and the maxfill of the node 408. The split overlapping regions thus chose are compared with a reference value (20%) 409. If they occur more than the reference value, then the split is not carried out, but an extension is carried out with a super node 410. If they occur less than the reference value, then a checking is carried out as to whether the overlap regions are same 411. If they are not same, then the split dimension which shows the minimum overlaps is chosen 412. If the overlap regions are same, then a checking is carried out as to whether the areas are game 413. If the areas are not same, then the split dimension which shows the minimum area is chosen 414. If the areas are same, then a checking is carried out as to whether the margin lengths are same 415. If the margin lengths are not same, then the split dimension which shows the minimum margin length is chosen 415. If the margin lengths are same, then the split dimension which is capable of equally dividing the entries of the two nodes is chosen 417.

FIG. 5 is a flow chart showing the split algorithm for the terminal node according to the present invention. When splitting the terminal node also, first the dimension for splitting must be decided. For this purpose, the indivisible dimensions are excluded 51. The dimension having the greatest range is chosen from among the rest of them 52. After selecting the dimension, the elements according to the dimension are stored. Then the split position which shows the smallest area among the many split positions which lies between the minfill and the maxfill of the entries of one node among the splitted two nodes is chosen 53. Then a checking is carried out as to whether the areas of the chose split are same 54. If the areas are not same, then the split which shows a smaller area is chose 55. If the areas are same, a checking is made as to whether the margin lengths are same 56. If the lengths are not same, the split which shows a smaller margin length is chosen 57. If the lengths are same, then the split which is capable of equally dividing the entries of the two nodes is chosen 58.

Figure 6A:
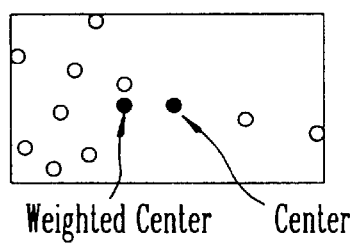
FIGS. 6a to 6c illustrate the method for choosing the re-insertion objects based on the weight center and the volume center.
Figure 6B:
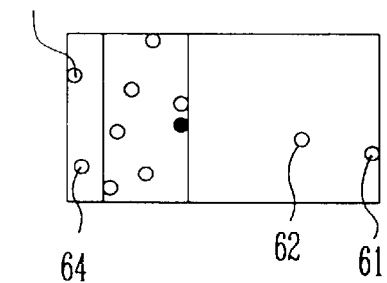
Figure 6C:
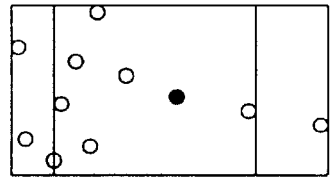

FIGS. 6a to 6c illustrate the method for choosing the re-insertion objects based on the weight center and the volume center.

FIG. 6a illustrates the weighted center and the geometric center when the node overflows. While the conventional CIR chooses the objects based on the geometric center, the ECIR algorithm of the present invention chooses the objects based on the weight center. FIG. 6b illustrates the choose of the re-insertion objects based on the weighted center. The weighted center C of a node N is defined as $$c = \frac{\sum_{i=1}^{n} e_i}{n}$$

Where n is the number of entries in the node N and ei is i-th entry in the node N. The objects to be re-inserted are chosen starting from the ones which are remotely separated from the weighted center. Therefore, the objects to be re-inserted are chosen in the sequence of 61, 62, 63 and 64. The chose number is decided by a predetermined value. In the present invention, about 40% of the objects which lies in the node are chose. The weighted center is moved toward the region where more objects lie, thereby more efficiently forming the tree structure. FIG. 6c illustrates the choose of the re-insertion objects based on the center. Here, the node which lies most proximally to the center is chosen, when the node overflows.

Table 1 shows the results of comparison between the ECIR tree algorithm of the present invention and those of the conventional CIR, X, and TV trees.

TABLE 1

|  | Uniform distrbtn | Exponential distrbtn | Normal Distrbtn | Average distrbtn |
|---|---|---|---|---|
| ECIR tree | 9.4 | 10.5 | 15.6 | 11.86 |
| TV tree | 76.3 | 82.5 | 88.1 | 82.30 |
| X tree | 15.0 | 16.9 | 25.6 | 19.16 |
| CIR tree | 13.5 | 14.7 | 19.3 | 15.33 |

In obtaining the above results, the number of the input data was 100,000, the size of the data was 100 bytes, and the number of the particular dimensions was 10~100. In this case, the above table shows the average number of nodes accessed during the search in the indexing structure. In dimension to show the superiority and feasibility of the ECIR algorithm, the number of the nodes are shown classified by uniform distribution, exponential distribution, and normal distribution. The uniform distribution represents the data which are uniformly distributed in the node. The exponential distribution represents the data which are biased to one side. The normal distribution shows the data which are concentrated to the middle. As can be seen in Table 1 above, when 100,000 input data were used, the ECIR indexing structure obtains an advantage of 85.6% over the TV tree, 38.1% over the X tree, and 25.1% over the CIR tree in terms of retrieval time. Thus it is seen that the ECIR indexing structure is superior over the conventional indexing structure under any category. The reason is that the ECIR indexing structure uses the weighted center for reinsertion operations unlike the conventional methods.

Figures 7A, 7B:
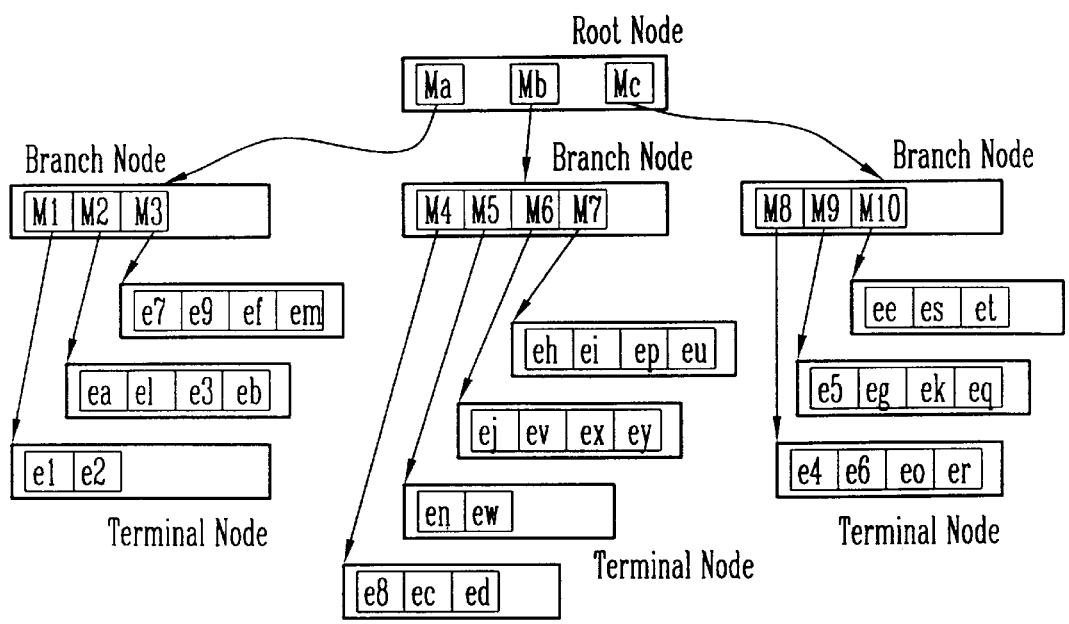
FIGS. 7a to 7c illustrate the ECIR tree structures for virtual data.
Figure 7C:
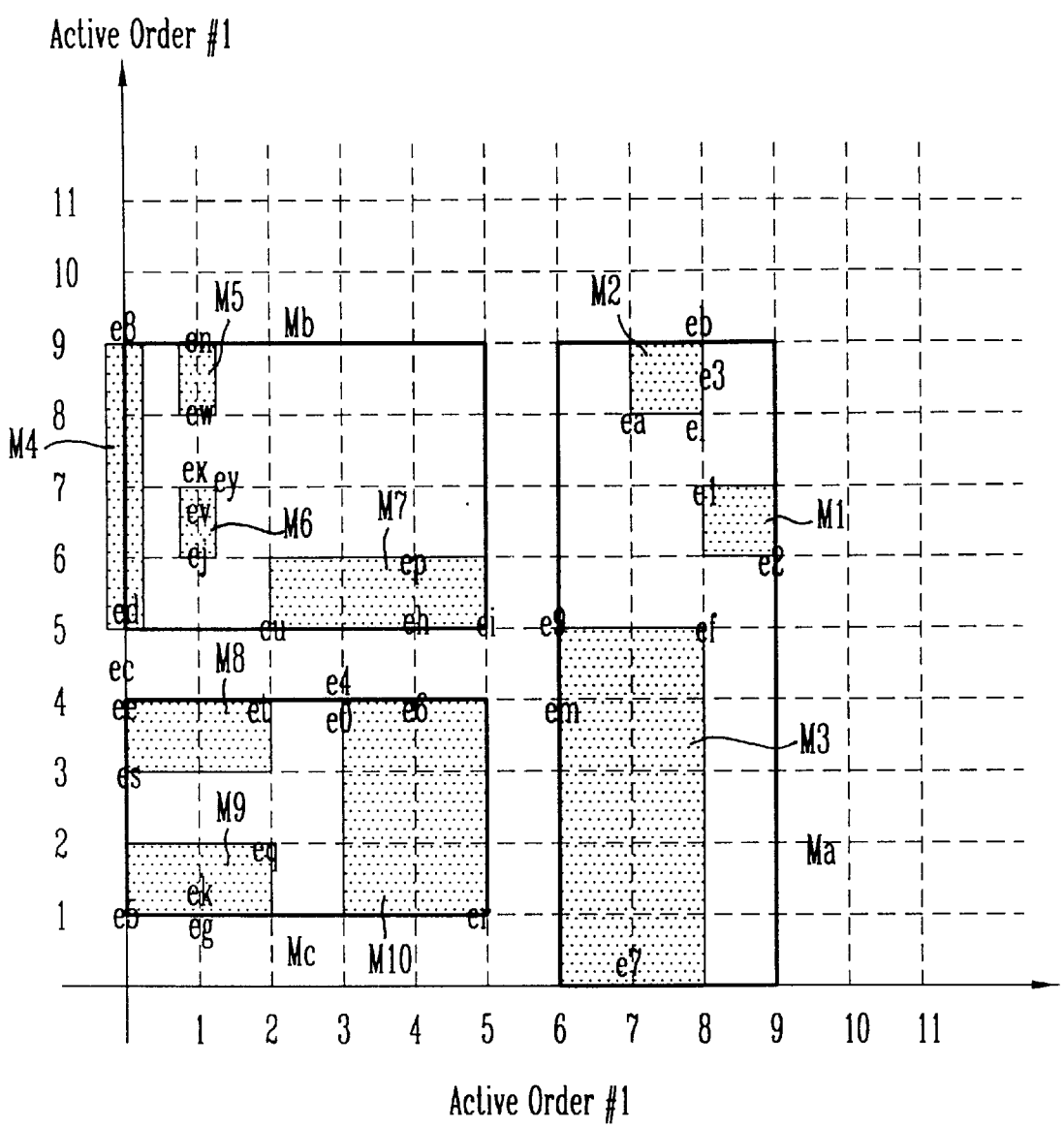

Table 2 and FIGS. 7a to 7c illustrate the construction process of the ECIR tree for virtual data. Table 2 shows the used virtual data, and FIG. 7a illustrates the finally formed ECIR tree, when the data are sequentially inserted by using the object inserting algorithm of the present invention. FIG. 7b illustrates the MBR information, and FIG. 7c illustrates the data which are inputted at active dimensions.

TABLE 2

| | | | |
|---|---|---|---|
| [e1](8,7,1,3,7,5,4,7) | [e2](9,6,2,4,8,4,0,6) | [e3](8,9,1,9,6,0,8,8) | [e4](3,4,1,3,5,2,7,3) |
| [e5](0,1,5,1,0,1,5,6) | [e6](4,4,4,6,3,7,1,7) | [e7](7,0,9,3,7,9,0,4) | [e8](0,9,4,5,6,8,4,1) |
| [e9](6,5,4,8,9,4,0,8) | [ea](7,8,3,4,7,1,7,2) | [eb](8,9,4,6,5,8,0,4) | [ec](0,5,7,2,4,3,8,3) |
| [ed](0,5,5,6,7,0,3,5) | [ee](0,4,1,0,7,9,8,3) | [ef](8,5,1,7,9,1,9,4) | [eg](1,1,3,3,2,8,1,0) |
| [eh](4,5,3,8,3,4,5,8) | [ei](5,5,2,4,2,0,8,8) | [ej](1,6,6,4,8,1,9,7) | [ek](1,1,2,0,1,7,1,6) |
| [el](8,8,2,3,3,6,2,1) | [em](6,4,8,3,6,1,1,0) | [en](1,9,2,1,9,9,7,2) | [eo](3,4,4,3,3,1,6,7) |

TABLE 2-continued

| | | | |
|---|---|---|---|
| [ep](4,6,9,5,7,1,9,7) | [eq](2,2,1,2,1,5,7,6) | [er](5,1,3,4,6,9,7,5) | [es](0,3,2,1,9,0,2,5) |
| [et](2,4,6,2,2,7,3,5) | [eu](2,5,0,4,4,3,1,0) | [ev](1,7,7,7,8,1,5,8) | [ew](1,8,3,9,8,7,6,5) |
| [ex](1,7,0,5,2,9,4,4) | [ey](1,7,9,9,7,2,5,0) | | |

To take one example from the table, the root node Mb has branch nodes M4, M5, M6 and M7. The branch node M4 forms the terminal nodes with e8, ec and ed. As can be seen in Table 2 above, the terminal nodes e8, ec and ed have the same first dimension 0, and therefore, as illustrated in FIG. 7b, the branch node M4 has an inactive value 0. Further, among the second dimension values 9, 5 and 5, the branch node M4 has the maximum value 9 and the minimum value 5. In the third dimension values 4, 7 and 5, the branch node M4 has the maximum value 7 and the minimum value 4. These will be expressed by lower (5 and 4) and upper (9 and 7), and will be expressed in graphs as in FIG. 7c. As illustrated in FIG. 7c, the branch node M4 has a terminal node e8 having the maximum value 9, and has the terminal nodes ec and ed having the minimum value 5. Thus the circumference and the area of the branch node are decided.

In the above, the present invention was specifically described based on the attached drawings, but it should be apparent to those ordinarily skilled in the art that various changes and modification can be added without departing from the scope of the present invention as defined in the appended claims.

According to the present invention as described above, there are adopted an efficient choosing standard during the insertion, and a split algorithm for dividing the branch nodes and the terminal nodes. Further, the weighted center is adopted for choosing the objects for the reinsertions, and therefore, the clustering effect is improved in the indexing structure, thereby obtaining a superior search capability compared with that of the conventional indexing structures.

What is claimed is:

1. A method for inserting a high-dimensional index structure for a content-based image retrieval, comprising the steps of:
    (a) inserting an object into a root node if a tree consists of only a root node;
    (b) forming a new root node when an existing root node overflows;
    (c) after inserting an object if the child nodes of the root node are branch nodes, choosing the branch node with the following sequences, 1) the MBR that has minimum number of new pairs of overlapping MBR within the root node, 2) the MBR that uses more dimensions for discrimination, 3) the MBR whose center is close to a new object, and 4) the MBR showing less increase in a size of a minimum bounding region;
    (d) choosing objects based on weighted center to re-insert them into the branch node if the branch node overflows;
    (e) splitting the branch node if the branch node overflows, and otherwise, adjusting the minimum bounding region (MBR);
    (f) choosing a lower node as a terminal node to insert an object if a child node of the root node is a branch node;
    (g) choosing objects based on a weighted center to re-insert them into the terminal node if the terminal node with an object inserted into it overflows; and
    (h) splitting the terminal node, and then, carrying out the steps c to g to insert a new object into the branch node if the terminal node overflows after a re-insertion.

2. The method as claimed in claim 1, wherein a weighted center of the terminal node is obtained by dividing the result value obtained by adding object values of same dimensions by the number of entries.

3. The method as claimed in claim 1, wherein a weight center of said branch node is obtained by dividing center values of said minimum bounding regions by a number of entries.

4. The method as claimed in claim 1, wherein re-insertion objects are chosen starting from those most remotely positioned from the weighted center.

5. The method as claimed in claim 1, wherein a splitting of the branch nodes comprises the steps of:
    choosing a dimension having the widest range and divisible without generating overlaps;
    choosing a dimension having the widest non-overlapping range and satisfying a minimum existable number of objects during a division if there is no divisible dimension with overlap-free regions;
    choosing a split having minimum overlapping regions from among many splits lying between a minimum filling and a maximum filling of objects after sorting them based on a weighted center for a chose dimension;
    comparing the chose split with a reference value to extend it to a super node if the chose split is higher than the reference value; and
    making chooses in a sequence of a split having small overlap regions, a split having a minimum area, a split having a small margin length, and a split divisible into same numbers, if the chose split is lower than the reference value.

6. The method as claimed in claim 1, wherein a split of the terminal nodes comprises the steps of:
    choosing a dimension having the widest range and divisible without generating overlaps;
    choosing a split having a minimum area from among many splits lying between minfill and maxfill of the node during splitting of number of entries in one of divided two nodes after sorting them for the chose dimension; and
    making chooses in a sequence of a split having a minimum area, a split having a small margin length, and a split divisible into same numbers of entries.

7. A recording medium comprising:
    a means for judging on constituent elements of a tree;
    a means for inserting an object into a root node if the tree consists of a root node, and forming a new root node if the existing root node overflows;
    a means for inserting an object if child nodes of the root node are branch nodes, and choosing the branch nodes in a sequence of one having less overlaps with near by nodes, one having same values in many dimensions, one showing less increase in a minimum bounding region size, and one disposed more adjacently to a center;
    a means for adding a mean value of a minimum bounding region if the branch node overflows, obtaining a weighted center by dividing the result value obtained by adding the center values of MBRs by the number of entries, and choosing re-insertion objects in a sequence of remote positioning from the weighted center to re-insert them into the branch nodes;

a means for splitting the branch node if the branch node overflows with the objects, and otherwise, adjusting the minimum bounding region;

a means for choosing a terminal node if a child node of the root node is a terminal node or if a child node of the branch node is a terminal node, then inserting an object into the terminal node, then adding an object value of a same dimension, then obtaining a weighted center by dividing the result value obtained by adding object values of the same dimensions by the number of entries, and then choosing a re-insertion objects to re-insert it into said terminal node; and a means for splitting the terminal node if the terminal node overflows, and inserting a new object into the branch node, whereby a program for activating the above means is read by a computer.

* * * * *